F. A. EIGENMANN.
VEHICLE BRAKE.
APPLICATION FILED OCT. 22, 1908.
944,603.
Patented Dec. 28, 1909.
2 SHEETS—SHEET 1.
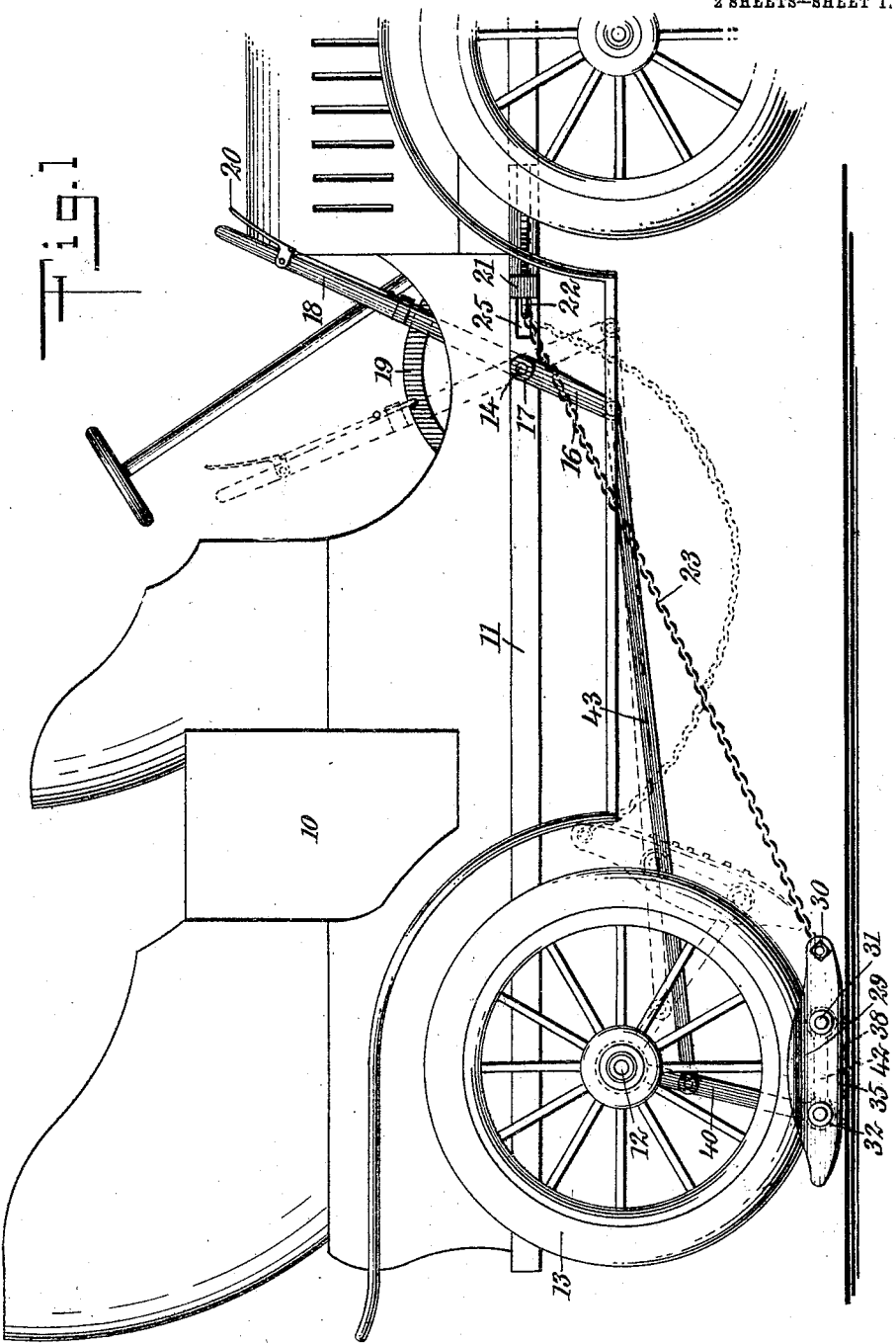
WITNESSES
INVENTOR
Frederick A. Eigenmann
BY
ATTORNEYS

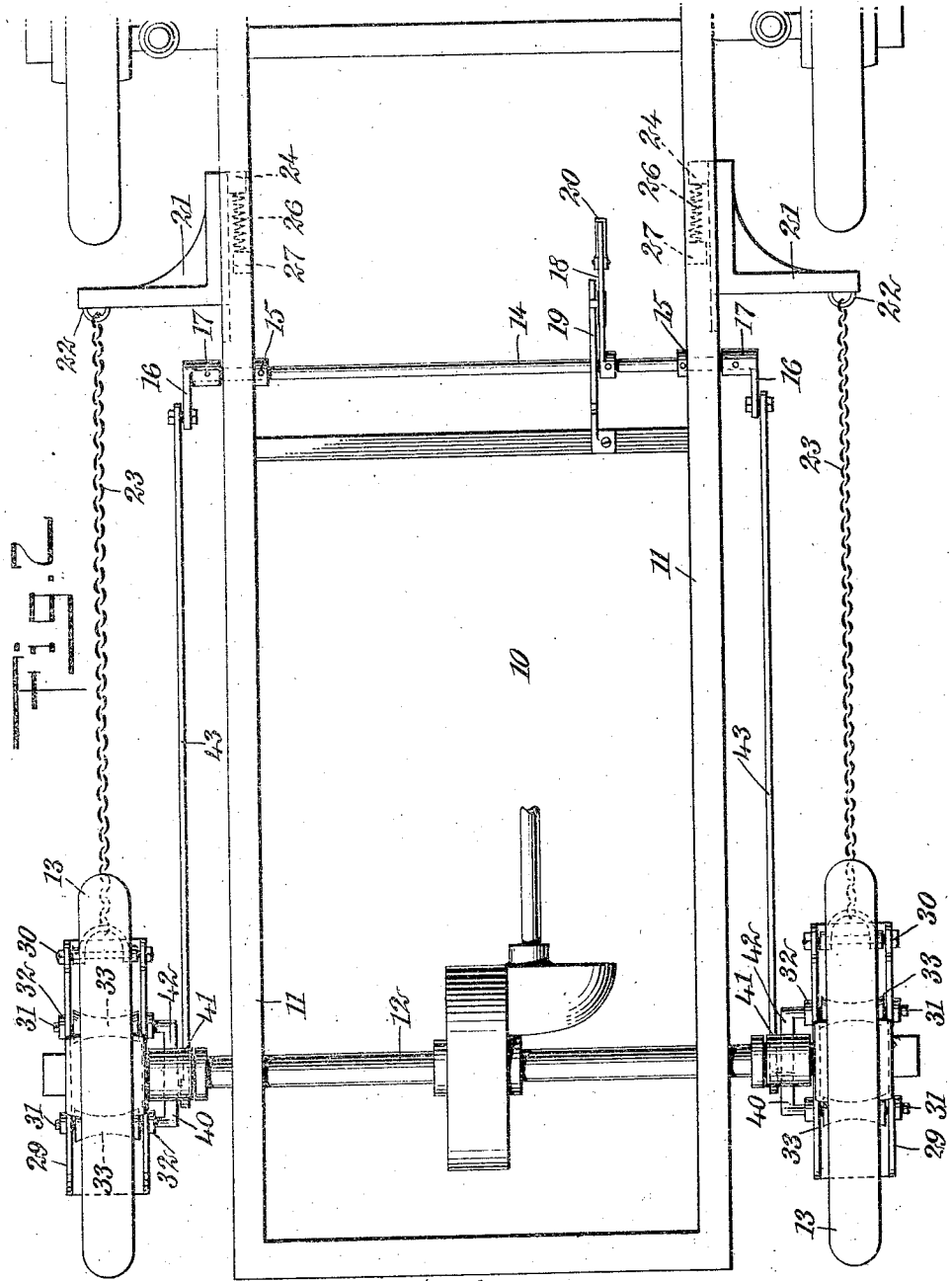

UNITED STATES PATENT OFFICE.

FREDERICK ANDREW EIGENMANN, OF NEWARK, OHIO.

VEHICLE-BRAKE.

944,603.  Specification of Letters Patent.  Patented Dec. 28, 1909.

Application filed October 22, 1908. Serial No. 459,082.

*To all whom it may concern:*

Be it known that I, FREDERICK ANDREW EIGENMANN, a citizen of the United States, and a resident of Newark, in the county of Licking and State of Ohio, have invented a new and Improved Vehicle-Brake, of which the following is a full, clear, and exact description.

This invention relates to vehicle brakes which are specially adapted for use in connection with automobiles or other motor vehicles, and more particularly to a vehicle brake by means of which the bodily movement of a vehicle can be arrested without arresting the rotation of the driving wheels, and comprising shoes having rollers for movably supporting the driving wheels, means for holding the shoes inoperative, and means for positioning the shoes to receive the wheels when it is desired to bring the vehicle to a sudden stop.

The object of the invention is to provide a simple, inexpensive and efficient vehicle brake for use in connection with motor vehicles and the like, by means of which the vehicle can be brought to a sudden stop without arresting the rotation of the driving wheels, so that the strain upon the motor, incident to the sudden application of the ordinary brakes is obviated.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation showing a motor vehicle having an embodiment of my invention applied thereto, and illustrating certain of the parts in different positions in dotted outline; Fig. 2 is a plan view of the chassis of a vehicle having my invention applied thereto; and Fig. 3 is an enlarged cross section of one of the shoes forming a part of the device.

Before proceeding to a more detailed explanation of my invention, it should be clearly understood that with the ordinary band or other brakes now in use upon automobiles or other motor vehicles, the sudden application of the brakes to stop the vehicle, results in the locking of the wheels or in greatly retarding the speed of the same, whereby the motor and the connecting mechanism are usually put to severe strain. At the same time the locking of the wheels causes the tires to suffer owing to the excessive wear, particularly if the vehicle skids or slides laterally. I provide a brake by means of which the bodily movement of the vehicle can be arrested while the driving wheels can continue to rotate, thereby avoiding the strain upon the motor and the wear of the tires resulting from the sudden application of ordinary brakes. The use of my invention does not lift the weight of the vehicle from the driving wheels thereby leaving the wheels free to race, but the wheels continue to support the weight of the vehicle, and the danger of racing is thus obviated. It will be understood that should the wheels and the motor driving them race, owing to the sudden removal of the weight, the parts would be subjected to severe strain.

Referring more particularly to the drawings, 10 represents a motor vehicle of any preferred or common form having a supporting frame or chassis 11, and a rear or driving axle 12 which is supported by the rear or driving wheels 13. A rock shaft 14 is journaled upon the frame sides near the forward part of the frame and extends laterally beyond the same, having rigid collars 15 by means of which it is movably positioned. At the projecting ends, the rock shaft carries lever arms 16 rigidly secured thereto by means of sleeves 17 or the like. A hand lever 18 is rigidly secured to the rock shaft and extends upwardly therefrom. The hand lever is positioned adjacent to the driver's seat of the vehicle and serves for the manual operation of the rock shaft. A notched segment 19 is positioned adjacent to the hand lever 18 and the latter has a catch 20 adapted to coöperate with the segment so that the lever can be held in a plurality of positions. At each side of the chassis, in front of the rock shaft, is carried a laterally extended bracket 21 having an eye 22 in which is movably mounted the end of a flexible member such as a chain 23. The brackets have lugs 24 arranged to slide in slots 25 of the frame sides, the movement of the brackets being limited by the ends of the slots. The lugs have constricted portions engaging the slots so that the brackets cannot be displaced therefrom. Springs 26 are arranged between the lugs 24 and stops 27 mounted upon the frame sides, which resist the movement in one direction of the brackets.

I employ shoes 29 of channel form and having the ends slightly oppositely disposed. Each of the shoes at the forward end has a cross bolt 30 which is secured to the end of one of the chains 23. Intermediate its ends, each shoe has pintles 31 journaled in openings in the shoe sides and projecting beyond the latter. Each pintle, at the outer sides of the shoe, has nuts or washers 32 which hold them against lateral displacement. Rollers 33 are carried by the pintles and are preferably grooved, having end plates 34 secured thereto in any suitable manner. Each shoe has a sole 35 provided with lugs 36 extending through suitable openings in the bottoms of the shoes and secured in place by means of pins 37. The soles, at the under sides, have cleats or teeth 38 adapted to engage the roadway to increase the resistance to the sliding of the shoe along the same. Inner soles 39 are arranged between the soles 35 and the bottoms of the shoes. These inner soles are preferably fashioned from asbestos or other non-inflammable and heat-insulating material, so that the heat due to the friction resulting when the shoes are slid along the roadway cannot be easily transmitted to the tires to injure them.

Arms 40 are pivoted by means of sleeves 41 upon the driving axle adjacent to each of the rear wheels. The arms have laterally disposed extensions 42 which are arranged at the sides of the shoes and which, at the ends, are secured to the forward pintles 31 of the shoes. The rear pintles of the shoes are secured to the arms adjacent to the extension 42. Links 43 are pivoted to the arms 40 intermediate their ends and are pivotally secured at the extremities of the lever arms 16. When the hand lever 18 is in its rearward position the shoes are inoperatively disposed as indicated in dotted outline in Fig. 1. When it is desired to position the shoes operatively to bring the vehicle to a stop, the hand lever 18 is thrown forward. This movement swings the arms 40 toward the rear of the vehicle, owing to the provision of the links 43. The rearward movement of the arms 40 carries the shoes in the same direction and these swing into contact with the ground so that the wheels are raised from the ground and continue to rotate, being in engagement with the rollers 33. The sudden contact of the shoes with the ground results in great friction which tends to bring the vehicle to a stop with great suddenness. The chains 23 hold the shoes in place and prevent the wheels from passing from the same, the springs 26 in a certain measure taking the shock due to the sudden application of the brake. As the wheels can continue to rotate despite the fact that the bodily movement of the wheels is arrested, there is no strain on the motor, due to the sudden stop. Furthermore, as the wheels continue to support the weight of the vehicle there is no danger of the wheels racing, with a like action on the part of the motor.

Having thus described my invention, I claim as new and desire to secure by Letters Patent:

1. The combination with a vehicle having a driving axle and supporting wheels, of brackets carried by said vehicle and having a limited cushioned movement, arms pivoted upon said driving axle, shoes carried by said arms, rollers carried by said shoes and serving rotatably to support said wheels, a controlling lever, links connecting said arms and said controlling lever, and flexible members connecting said brackets and said shoes.

2. The combination with a vehicle having a frame, a driving axle and supporting wheels, of a rock shaft mounted upon said frame, a hand lever controlling said rock shaft, brackets slidably mounted upon said frame and having lugs, said frame having lugs, springs between said lugs of said frame and of said brackets, arms pivoted upon said axle, shoes carried by said arms and adapted to support said wheels rotatably, lever arms rigid with said rock shaft, links operatively connecting said lever arms and said first arms, and members connecting said brackets and said shoes.

3. The combination with a vehicle having a frame, a driving axle and supporting wheels, of a rock shaft mounted upon said frame, a hand lever controlling said rock shaft, means for holding said hand lever in a plurality of positions, said frame having slots, brackets slidably mounted in said slots and having lugs, said frame having lugs, cushioning means between said lugs of said frame and of said brackets, arms pivoted upon said axle, shoes carried by said arms and having rollers for rotatably supporting said wheels, lever arms rigid with said rock shaft, links operatively connecting said lever arms and said first arms, and flexible members connecting said brackets and said shoes.

4. A vehicle brake having a shoe adapted to be inserted under a vehicle wheel, said shoe comprising a body having a bottom, and a sole under said bottom and provided with lugs, said bottom having openings adapted to receive said lugs, and an inner sole of non-inflammable material between said bottom and said sole.

5. A vehicle brake having a shoe, means for controlling said shoe whereby the same can be inserted under a vehicle wheel, said shoe comprising a body, pintles journaled transversely of said body and carrying rollers, a sole arranged at the under side of said shoe and having lugs, said shoe having openings adapted to receive said lugs, and an inner sole between said sole and said shoe and consisting of heat-insulating material, said sole having cleats at the under side thereof.

In testimony whereof I have signed my name to this specification in the presence of two subscribing witnesses.

FREDERICK ANDREW EIGENMANN.

Witnesses:
HERMANN R. LEECKNER,
MATTHEW W. KNUEPFER.